(No Model.)
W. W. SPEER.
PLOW.
No. 447,498. Patented Mar. 3, 1891.
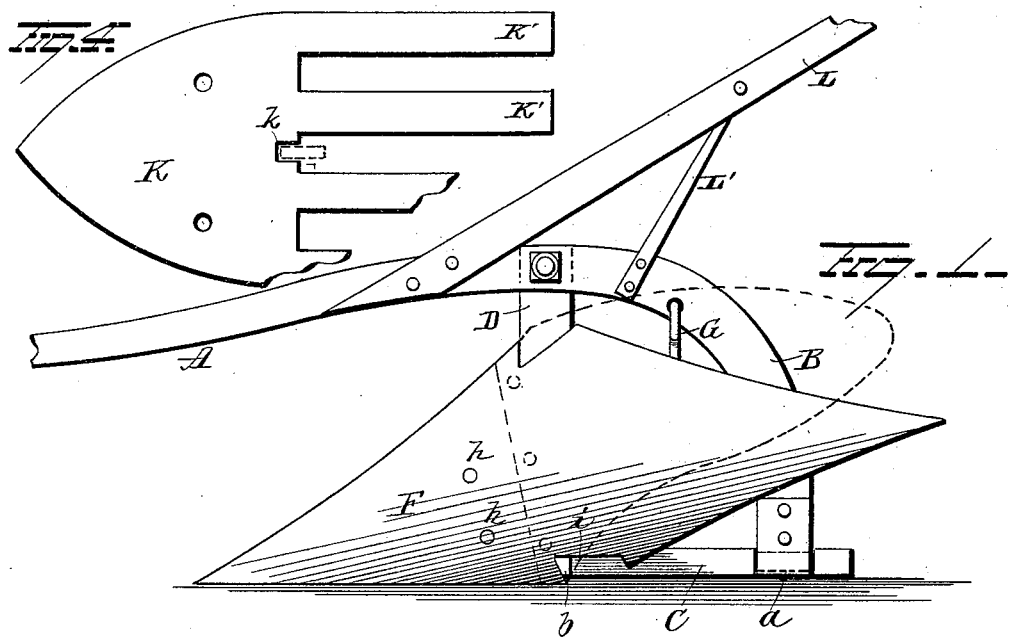
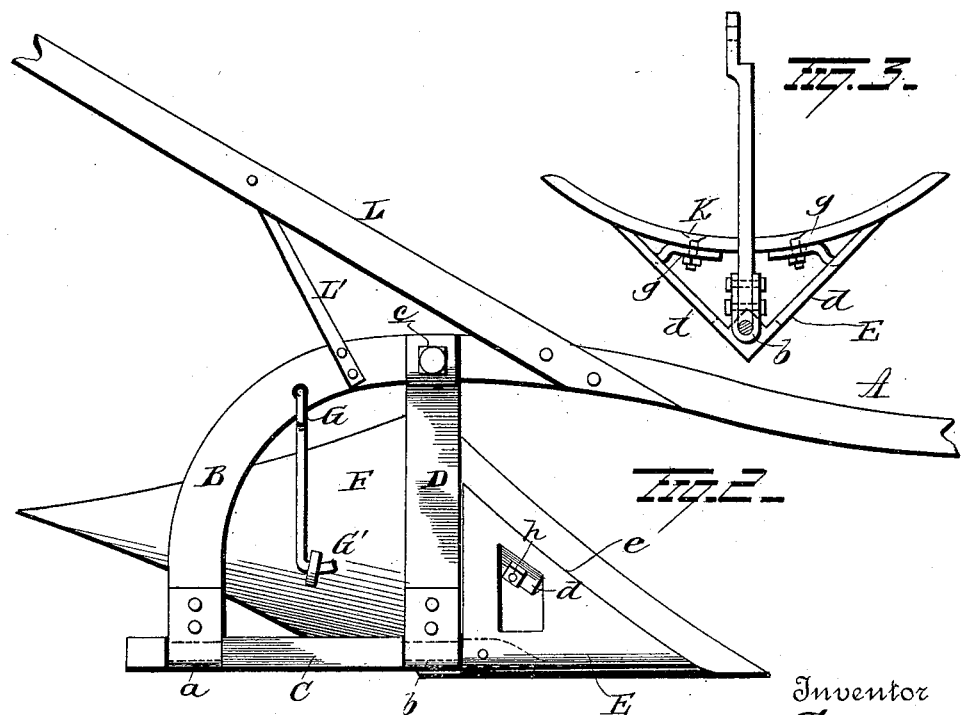

UNITED STATES PATENT OFFICE.

WILLIAM W. SPEER, OF PITTSBURG, PENNSYLVANIA.

PLOW.

SPECIFICATION forming part of Letters Patent No. 447,498, dated March 3, 1891.

Application filed October 17, 1890. Serial No. 368,397. (No model.)

*To all whom it may concern:*

Be it known that I, WILLIAM W. SPEER, a citizen of Pittsburg, in the county of Allegheny and State of Pennsylvania, have invented certain new and useful Improvements in Plows; and I do hereby declare the following to be a full, clear, and exact description of the invention, such as will enable others skilled in the art to which it appertains to make and use the same.

My invention relates to an improvement in plows, and more particularly to side-hill shovel-plows adapted for use as such or for ditching purposes, the object of the invention being to produce a plow of the class specified, having a removable shovel and efficient and simple means for adjusting the same to operate at either side of the plow.

A further object is to provide a plow with means for supporting a removable shovel, and to so arrange the device that a mold-board may be adjustably secured to said shovel when desired.

A further object is to provide a plow with a swivel-support for a shovel, and to so construct said support that a shovel adapted for use as a potato-digger may be removably secured thereto.

A further object is to produce a plow of the class named, which shall be simple in construction, effective in operation, and one comprising a small number of parts.

With these objects in view the invention consists in certain novel features of construction and combinations and arrangements of parts, as hereinafter set forth, and pointed out in the claims.

In the accompanying drawings, Figure 1 is a side elevation of my improved plow. Fig. 2 is a similar view taken from the opposite side, showing the application thereto of a removable mold-board. Fig. 3 is a view illustrating the manner of attachment of a shovel to adapt the plow for use as a potato-digger. Fig. 4 is a view of shovel K.

A represents the plow-beam, which is curved downwardly at its rear end to produce the stock B. At the lower end of the stock a loop or eye $a$ is formed or secured thereto and serves as one bearing for a shaft C, the other bearing of said shaft being produced by an eye or loop $b$ at the lower end of a standard D, which latter is secured at its upper end to the beam A by means of a bolt $c$ or in any other suitable manner.

Secured to and carried by the forward end of the shaft C is a plate E, the general form of which is preferably V-shaped and so bent as to form one-half of a hollow cone, having flat faces $d$ and straight edges $e$ and $f$, the latter of which is adapted to bear against the standard to form a support for the shovel. The flat faces $d$ are cut as shown in Fig. 3, and the ears $g$ thereby produced turned up to produce bearings for the shovel or plow F. The shovel or plow F is secured to the ears $g$, and preferably also to the plate E, by means of bolts $h$, said bolts being headed at one end and at the other end provided with screw-threads for the reception of suitable nuts. The shovel or plow is dished somewhat and made diamond-shaped; or, in other words, said shovel is made with two points or shovels, each of V shape, the center of the edges of said shovel or plow, or the meeting-point of the two V-shaped shovels, being provided with notches $i$, adapted to receive the standard D, and thus permit the plow or shovel F to assume the proper position relatively to the beam A, and, further, by this construction the standard D is made to assume a portion of the strain brought to bear on the shovel F in the operation of the device. The shovel F being swiveled to the plow-frame, as above explained, it may be readily adjusted to either side thereof, and is secured in either position by means of a rod G, one end of which is connected to the stock B and the other end provided with a hook G', adapted to engage an eye H, secured to the bottom face of the shovel F, another eye being located near the other end of the shovel, to be engaged by the hook G' when the shovel is turned end for end. By thus providing a double-ended shovel and removably securing it to the plow-frame it may be readily turned end for end when one point has worn away. The increased surface afforded by such a shovel will also provide a bearing for a removable mold-board J, as shown in Fig. 2, which mold-board is secured to the exposed face of the shovel by means of suitable bolts.

In order to render the device applicable for a potato-digger, the shovel F will be removed and the plate E made to assume a horizontal position, and a shovel K, having rearwardly-extending fingers K', is secured to said plate. At the center of the rear edge of the shovel K, between the two center fingers K', a notch k is produced, which notch is adapted to receive the standard D, and thereby maintain the shovel K in proper fixed position. Handles L are secured to the beam A and suitably braced by means of brace-rods L'.

The device thus constructed is very simple, comprising a small number of parts, is comparatively cheap to manufacture, and is effectual in the performance of its functions.

It is evident that slight changes might be made in the details of construction of my invention without departing from the spirit thereof or limiting its scope. Hence I do not wish to limit myself to the precise details of construction herein set forth; but, Having fully described my invention, what I claim as new, and desire to secure by Letters Patent, is—

1. The combination, with a stock and standard, of a rocking shaft supported in the lower ends of said parts, and a plate or block secured to the forward end of the shaft and adapted to act as a seat for removable parts, such as a mold-board or shovel, said plate or block having projections or ears thereon adapted to engage and have attached to them the removable part, substantially as set forth.

2. The combination, with a stock and a standard, of a rocking shaft supported in the lower ends of said parts, and a plate or block secured to the forward end of the shaft and adapted to act as a seat for removable parts, such as a mold-board or shovel, and capable of serving as a shoulder to bear against the standard when in certain positions, substantially as set forth.

3. The combination, with a stock and standard, of a shaft loosely supported in the lower ends of the stock and standard, a plate or block secured to the shaft, and a double-pointed mold-board removably secured to the plate and adapted to have its ends reversed, said mold-board having notches in its edges adapted to receive the standard, substantially as set forth.

In testimony whereof I have signed this specification in the presence of two subscribing witnesses.

WILLIAM W. SPEER.

Witnesses:
HUGH J. CRAIG,
K. T. MEADE.